US010673039B2

(12) United States Patent
Hoefler et al.

(10) Patent No.: US 10,673,039 B2
(45) Date of Patent: Jun. 2, 2020

(54) HOUSING FOR ACCOMMODATING A STACK OF FUEL CELLS, BATTERIES OR CAPACITORS

(71) Applicant: Bayerische Motoren Werke Aktiengesellschaft, Munich (DE)

(72) Inventors: Thomas Hoefler, Groebenzell (DE); Paul Eitzenberger, Frankfurt a. Main (DE); Martin Moser, Munich (DE); Lukas Wittchen, Neuried (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 34 days.

(21) Appl. No.: 16/009,312

(22) Filed: Jun. 15, 2018

(65) Prior Publication Data

US 2018/0294453 A1    Oct. 11, 2018

Related U.S. Application Data

(63) Continuation of application No. PCT/EP2016/076347, filed on Nov. 2, 2016.

(30) Foreign Application Priority Data

Dec. 16, 2015   (DE) .................. 10 2015 225 350

(51) Int. Cl.
*H01M 10/052* (2010.01)
*H01M 2/10* (2006.01)
(Continued)

(52) U.S. Cl.
CPC .......... *H01M 2/1077* (2013.01); *H01G 11/12* (2013.01); *H01G 11/78* (2013.01);
(Continued)

(58) Field of Classification Search
CPC ................. H01M 10/052; H01M 10/0525
See application file for complete search history.

(56) References Cited

U.S. PATENT DOCUMENTS

2009/0246595 A1   10/2009   Watanabe
2009/0269652 A1   10/2009   Hafemeister
(Continued)

FOREIGN PATENT DOCUMENTS

DE    10 2006 042 109 A1    3/2008
DE    10 2008 059 964 A1    6/2010
(Continued)

OTHER PUBLICATIONS

International Search Report (PCT/ISA/210) issued in PCT Application No. PCT/EP2016/076347 dated Apr. 5, 2017 with English translation (seven pages).
German-language Written Opinion (PCT/ISA/237) issued in PCT Application No. PCT/EP2016/076347 dated Apr. 5, 2017 (11 pages).
German-language Search Report issued in counterpart German Application No. 10 2015 225 350.3 dated Jul. 29, 2016 with partial English translation (12 pages).

*Primary Examiner* — Olatunji A Godo
(74) *Attorney, Agent, or Firm* — Crowell & Moring LLP

(57) ABSTRACT

A housing is provided for accommodating a stack of fuel cells, batteries or capacitors, including a first half-shell and a second half-shell opposite the first half-shell, a first pressure plate arrangement and a second pressure plate arrangement opposite the first pressure plate arrangement, the stack being accommodated between the two half-shells and between the two pressure plate arrangements, each half-shell gripping each pressure plate arrangement on the outer face thereof.

20 Claims, 6 Drawing Sheets

(51) Int. Cl.
   *H01G 11/12* (2013.01)
   *H01G 11/82* (2013.01)
   *H01M 8/2475* (2016.01)
   *H01M 8/248* (2016.01)
   *H01M 8/2432* (2016.01)
   *H01G 11/78* (2013.01)
   *H01M 10/04* (2006.01)
   *B60L 58/10* (2019.01)
   *B60L 50/40* (2019.01)
   *B60L 58/30* (2019.01)

(52) U.S. Cl.
   CPC ............ *H01G 11/82* (2013.01); *H01M 8/248* (2013.01); *H01M 8/2432* (2016.02); *H01M 8/2475* (2013.01); *H01M 10/0481* (2013.01); *B60L 50/40* (2019.02); *B60L 58/10* (2019.02); *B60L 58/30* (2019.02); *H01M 2220/20* (2013.01); *H01M 2250/20* (2013.01); *Y02E 60/13* (2013.01); *Y02T 90/32* (2013.01)

(56) References Cited

U.S. PATENT DOCUMENTS

| | | | |
|---|---|---|---|
| 2010/0247999 A1* | 9/2010 | Ijaz | H01M 10/0468 |
| | | | 429/120 |
| 2013/0171480 A1* | 7/2013 | Englert | B60L 3/0046 |
| | | | 429/50 |
| 2013/0189559 A1 | 7/2013 | Giere | |

FOREIGN PATENT DOCUMENTS

| | | |
|---|---|---|
| DE | 10 2010 046 529 A1 | 3/2012 |
| DE | 11 2007 002 034 B4 | 3/2014 |
| DE | 20 2013 003 672 U1 | 7/2014 |
| DE | 103 92 581 B4 | 7/2014 |
| DE | 10 2011 110 703 A1 | 4/2015 |
| DE | 10 2013 020 909 A1 | 6/2015 |
| EP | 2 360 768 A1 | 8/2011 |
| EP | 2 658 023 A1 | 10/2013 |
| WO | WO 2014/167019 A1 | 10/2014 |

* cited by examiner

HOUSING FOR ACCOMMODATING A STACK OF FUEL CELLS, BATTERIES OR CAPACITORS

CROSS REFERENCE TO RELATED APPLICATIONS

This application is a continuation of PCT International Application No. PCT/EP2016/076347, filed Nov. 2, 2016, which claims priority under 35 U.S.C. § 119 from German Patent Application No. 10 2015 225 350.3, filed Dec. 16, 2015, the entire disclosures of which are herein expressly incorporated by reference.

BACKGROUND AND SUMMARY OF THE INVENTION

The present invention relates to a housing. A fuel cell stack, a battery stack or a capacitor stack is arranged in the housing. Furthermore, the invention relates to an energy supply unit for a motor vehicle. The energy supply unit includes the housing and the stack.

Fuel cell stacks usually have a plurality of bipolar plates which are stacked on one another. The bipolar plates, in particular for polymer membrane fuel cells, have to be braced under pressure, in order to ensure the electric contact and the sealing action of the media (hydrogen, air and coolant) among one another and to the outside over the corresponding service life. Furthermore, the fuel cell stack has to be protected against environmental influences, and an uncontrolled escape of hydrogen has to be prevented. High voltage safety has to be ensured during operation and in the case of an accident.

Furthermore, battery stacks are taken into consideration here. In the case of the battery stack, a plurality of electrochemical cells are stacked on one another. The battery stack configured as a lithium ion accumulator, for example, also has to be braced under pressure in order to ensure the function over the service life.

Pressure plates are usually arranged at the two ends in order to brace the corresponding stack. The pressure plates are connected to one another via tie rods. The tie rods are configured, for example, as threaded rods, straps or metal strips. The unit comprising the tie rods, the pressure plates and the stack is usually arranged in a medium-tight and electrically insulated housing. The pressure plates can also be supported on an "outer" housing, with the result that the longitudinal sides of the housing serve as tie rods.

It is an object of the present invention to specify a housing for receiving a fuel cell stack, a battery stack or a capacitor stack, which housing makes lightweight and simultaneously secure receiving of the stack possible with inexpensive production and simple assembly.

The object is achieved by way of the features of the independent claim. The subject matter of the dependent claims are advantageous refinements of the invention.

Therefore, the object is achieved by way of a housing for receiving the fuel cell stack, the battery stack or the capacitor stack. The housing comprises two half shells which lie opposite one another and two pressure plate arrangements which lie opposite one another. The corresponding stack can be arranged between the two pressure plate arrangements and at the same time between the two half shells, it also being possible for the pressure plates to be part of the half shells, i.e., to be integrated into the latter.

The two pressure plate arrangements point in each case with their inner side toward the stack. As described at the outset, the individual elements (bipolar plates, electrode/ membrane units and gas diffusion media and contact media of the fuel cell or electrochemical elements of the battery or battery cells or capacitor elements) of the stack are braced against one another. As a result of said bracing, a force which presses the two pressure plate arrangements away to the outside acts on the pressure plate arrangements. In order to absorb said force, the pressure plate arrangements have to be supported on their outer sides. It is provided according to the invention that each half shell engages around each pressure plate arrangement on its outer side. As a result, each of the two pressure plate arrangements is supported in each case on each half shell.

This refinement of the two half shells makes it possible that the two pressure plate arrangements do not have to be connected to one another via conventional tie rods within the half shells. Rather, the two half shells act as tie rods and at the same time represent an essential constituent part of the medium-tight housing. This is possible, in particular, by virtue of the fact that each half shell engages around each pressure plate arrangement on the outer side and the force of the bracing action is therefore divided among the two half shells.

The embodiment of the housing as half shells has the advantage that simple and inexpensive manufacturing methods can be used. This relates, for example, to forming of metal sheets, casting of metallic materials and injection molding, extruding and thermoforming of plastics, it being possible for structures which possibly also absorb force to be integrated in the case of the corresponding methods, such as fibers, straps and strips.

The stack and therefore the receiving space between the two half shells and between the two pressure plate arrangements are preferably rectangular. The two half shells primarily cover the two greatest congruent faces of the rectangular shape. The two pressure plate arrangements are situated on the end sides.

It is preferably provided that the two half shells are connected to one another on both sides, in each case on the outer sides of the pressure plate arrangements. Here, different methods can be used or the same method can be used twice on the two sides for connecting the two half shells.

It is provided, in particular, that a connecting element is arranged on at least one side, which connecting element is connected fixedly to the two half shells, as a result of which the two half shells are also connected fixedly among one another. The connecting element is particularly preferably screwed or riveted or adhesively bonded or connected in a positively locking manner to the half shells, for example, via a tongue and groove connection.

It is also preferably provided, furthermore, to connect the two half shells directly to one another on at least one side without a connecting element. The direct connection also takes place, for example, by screws or rivets or by way of adhesive bonding. As a further possibility, the two half shells can also be connected directly to one another in a positively locking manner, the tongue and groove connection being appropriate again.

In addition or as an alternative to the connection of the two half shells, at least one strap arrangement is preferably provided on the outer side of the half shells. As described at the outset, the half shells engage around the two pressure plate arrangements on the outer sides thereof, with the result that the half shells act not only as a housing but rather also as tie rods. In order to assist the half shells in their function as tie rods, the at least one strap arrangement is preferably used. Three variants are preferably provided here for the precise configuration.

In accordance with the first variant, two strap arrangements are used, each strap arrangement including at least one strap which extends over the corresponding half shell. The ends of the straps are fastened to strap bars. Since two strap arrangements are provided, there are four strap bars. The strap bars are preferably situated on the end side of the housing, i.e., on the outer side of the pressure plate arrangements. In order to close the housing, the strap bars are connected to one another, such as by being screwed to one another.

In the second variant, only one strap arrangement is used, the strap arrangement including at least one strap which extends around the two half shells. Here too, the ends of the at least one strap are again fastened to strap bars. As a consequence, there are two strap bars which are connected to one another, in particular, on the end side, in order to close the housing.

In the third variant, the straps are integrated functionally into the half shells.

The pressure plate arrangements are advantageously engaged around on their outer sides over as great an area as possible by the half shells. As a result, an area which is as great as possible is available for the introduction of the force into the half shells. As a result, the half shells can, in turn, be of relatively lightweight design. Accordingly, it is advantageously provided that the first pressure plate arrangement and/or the second pressure plate arrangement bears/bear against the half shells with at least 40%, preferably at least 50%, particularly preferably at least 60% of its/their outer face.

For the optimum transmission of force, bearing of the pressure plate arrangements with 100% of their outer face against the half shells would of course be advantageous. It is also taken into consideration here, however, that the pressure plate arrangements have to partially fulfill further functions and therefore cannot be covered completely by the half shells. For example, medium interfaces which must not be covered by the half shells are also configured in the pressure plate arrangements.

Thus, at least one medium interface is advantageously situated in the first pressure plate arrangement. The medium interface serves to exchange at least one gaseous or liquid medium between the stack and the surroundings. In the case of a configuration of the stack as a fuel cell stack, for example, the fuel, the oxidizing agent and the cooling liquid have to be exchanged beyond the housing. The battery stacks are also often cooled via a liquid.

The stacks can vary, due to manufacturing tolerances, in terms of their length, that is to say the spacing between the two pressure plate arrangements. In order to compensate for the fluctuations, it is preferably provided that at least one pressure plate arrangement has a tolerance compensation system. The medium interfaces are advantageously arranged in the first pressure plate arrangement. It is therefore preferably provided that the tolerance compensation system is configured in the second pressure plate arrangement. The tolerance compensation system ensures that the two pressure plate arrangements bear against the stack and at the same time against the half shells.

In a relatively simple refinement of the tolerance compensation system, the second pressure plate arrangement includes an end plate and a tolerance compensation element, preferably configured as a tolerance compensation plate. The end plate bears against the half shells. The tolerance compensation element is situated between the end plate below the stack. Before the installation of the stack into the housing, the stack is measured and a fitting tolerance compensation element, preferably a tolerance compensation plate with the fitting wall thickness, is selected and installed into the housing, in order thus to compensate for the fluctuations of the stack due to manufacturing tolerances.

The tolerance compensation element can also have resilient properties. As a result, it is possible to compensate for length changes of the stack owing to operation or service life.

Instead of or in addition to the tolerance compensation plate, at least one wedge-shaped element and/or a bar can also be pushed in as a tolerance compensation element between the end plate and the stack.

Furthermore, it is preferably provided that, for the tolerance compensation, the second pressure plate arrangement includes an end plate which bears against the half shells and a pressing plate which is arranged between the end plate and the stack. Here, the spacing between the end plate and the pressing plate can be changed via at least one actuating arrangement.

It is particularly preferably provided that the actuating arrangement can be actuated from the outside, i.e., through one of the half shells and/or through the pressure plate arrangement. As a result, it is possible to install the stack into the housing and to perform the corresponding tolerance compensation via the actuating arrangement only after closure of the housing.

The use of the actuating arrangement can also be combined with the above-described tolerance compensation element, great fluctuations, in particular, then being compensated for by way of the tolerance compensation element, and the actuating arrangement being activated after the assembly of the housing.

It is preferably provided that the actuating arrangement includes at least one screw, the pressing plate being supported on the end plate by the screw. The screw can be actuated from the outside by way of a simple cutout in the pressure plate arrangement.

As an alternative to the screw, an eccentric can also be used as an actuating arrangement between the pressing plate and the end plate. The eccentric can be rotated from the outside by way of a corresponding tool, in order thus to change the spacing.

Furthermore, it is preferably provided that the actuating arrangement includes a clearance between the pressing plate and the end plate, it being possible for a hardenable material to be injected into the clearance. In particular, at least one inlet is provided in the pressure plate arrangement and/or in the half shells, through which inlet the corresponding material can be injected. In particular, liquid or viscous plastic is injected which then hardens in the clearance and, as a result, fixes the spacing between the end plate and the pressing plate. This can be a thermoplastic or thermoset. In this context, thermosets also mean adhesives. It is also possible to use foam-like materials.

The spacing between the end plate and the pressing plate can be set by way of the injection of the material into the clearance. To this end, in particular, a cylinder/piston system is provided, the material being injected into the cylinder and the piston moving as a result. The piston in turn moves the pressing plate. After the hardening of the material, the cylinder is filled with the material, with the result that the piston can no longer move back.

Furthermore, it is preferably provided to set the spacing between the end plate and the pressing plate, for example, via the above-described screw, the eccentric or another method, and subsequently to inject the material into the clearance, in order to fix the spacing.

Current pickups are advantageously situated between the pressure plate arrangements and the stack. Insulation layers or insulation plates for the electric insulation are advantageously arranged in the pressure plate arrangements outside the current pickups.

Advantageously, one of the two half shells is or the two half shells are manufactured from plastic. This is, in particular, fiber reinforced plastic. The main direction of the fibers particularly preferably runs in the longitudinal direction, i.e., from one end side to the other. As a result, the fibers in the half shells act as tie rods. They are, in particular, what are known as "endless fibers" or "endless straps."

The half shells made from plastic are advantageously provided with an EMC coating.

Furthermore, it is preferably provided to manufacture at least one of the two half shells from metal. In particular, sheet metal is formed in order to produce the half shells. In the case of metallic materials, an insulating layer between the fuel cell stack and the housing is appropriate.

Both the metallic half shells and the half shells made from plastic are advantageously manufactured in one piece.

As described at the outset, the housing is configured, in particular, for a rectangular stack. The two greatest, congruent faces of the rectangular shape are called the upper side and lower side. The pressure plate arrangements are situated on the two end sides which lie opposite one another. The two remaining faces are called longitudinal sides which lie opposite one another.

It is advantageously provided that the first half shell covers the area of the upper side and the second half shell covers the area of the lower side in each case over at least 50%, preferably at least 80%, particularly preferably 100%. If, in particular, the medium interfaces are configured in the pressure plate arrangement, there do not have to be any connectors on the upper side and on the lower side, with the result that the upper side and the lower side can be covered completely by way of the half shells in this case.

An essential part of the present invention is that the two half shells extend from that portion which covers the upper side and the lower side towards the end sides, in order thus to engage around the two pressure plate arrangements. At the transition to the end-side region, the pressure plate arrangements advantageously have convex faces. The convex faces bear over the full surface area against the half shells. Accordingly, the half shells are of concave configuration in this region.

The half shells are subjected to tensile loading on account of the bracing action of the stack. In order to transmit the tensile loading satisfactorily between the end-side regions of the half shells, as great a radius as possible is provided on the concave faces of the half shells and on the convex faces of the pressure plate arrangements. The radius is advantageously at least 10 cm, preferably at least 15 cm.

The two longitudinal sides are preferably closed via corresponding covers. It is particularly preferably provided that the two half shells also extend onto the longitudinal sides at least over a small region. Here, the two half shells form the edge, to which the corresponding covers can be fastened. It is therefore advantageously provided that the two half shells cover at least 5% of the area of the longitudinal sides.

At least two conductor rails advantageously lead within the housing from the plate-shaped current pickups to one of the two longitudinal sides. The two conductor rails can be contacted on said longitudinal side, and a corresponding cover can be fastened to the half shells. The longitudinal side which lies opposite is also advantageously closed by way of a cover. Electronic components and connectors which are necessary to this end for actuating and/or monitoring the stack are advantageously arranged under said cover.

In a further embodiment, it is also possible that at least one of the longitudinal sides is closed, that is to say is engaged around by the half shells. The current connectors or conductor rails and the connectors for the electronic components can be guided to the outside to this end via apertures in the half shells on the upper side and/or lower side.

Moreover, it is also possible to contact the current pickups through the pressure plates.

The dividing plane of the half shells can in principle run longitudinally or transversely.

The housing which is described herein advantageously encloses the stack in a medium-tight manner. Accordingly, a seal is advantageously provided between the two half shells. The seal can be a separate insert part, or can be manufactured with one of the two half shells using the two-component injection molding method.

Furthermore, it is preferably provided that the described medium interfaces in the first pressure plate arrangement are sealed with respect to the two half shells. As described, the two longitudinal sides are advantageously closed by way of covers. The covers are also advantageously connected in a medium-tight manner to the two half shells.

It is preferably provided that fastening points for attaching holders are provided on the outer faces of the housing. The housing can preferably be fastened in a vehicle by the holders.

There are preferably apertures for applying bracing forces to the stack during the assembly process on at least one pressure plate side. There is further preferably at least one inlet for the introduction of hardenable material.

The housing preferably provides at least one apparatus for pressure equalization and/or for moisture control.

Furthermore, the invention includes an energy supply unit. The energy supply unit in turn includes the described housing and the stack which is arranged therein. The stack is configured either as a fuel cell stack or as a battery stack. The energy supply unit is situated, in particular, in a vehicle and is used for the power supply of an electric drive of the vehicle.

The advantageous refinements and subclaims which are described within the context of the housing according to the invention are used advantageously in a corresponding manner for the energy supply unit according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 to 9 show one exemplary embodiment of an energy supply unit 1 according to the invention. The energy supply unit 1 includes a housing 2. A stack 3 is arranged in the housing 2. In the example which is shown, the stack 3 is configured as a fuel cell stack and therefore comprises a plurality of bipolar plates 4 which are stacked on one another. As an alternative to this, the stack 3 might also be configured as a battery stack with a plurality of stacked electrochemical cells.

The energy supply unit 1 is provided for use in a motor vehicle. In the motor vehicle, it serves for the power supply of an electric drive.

Figure 1:
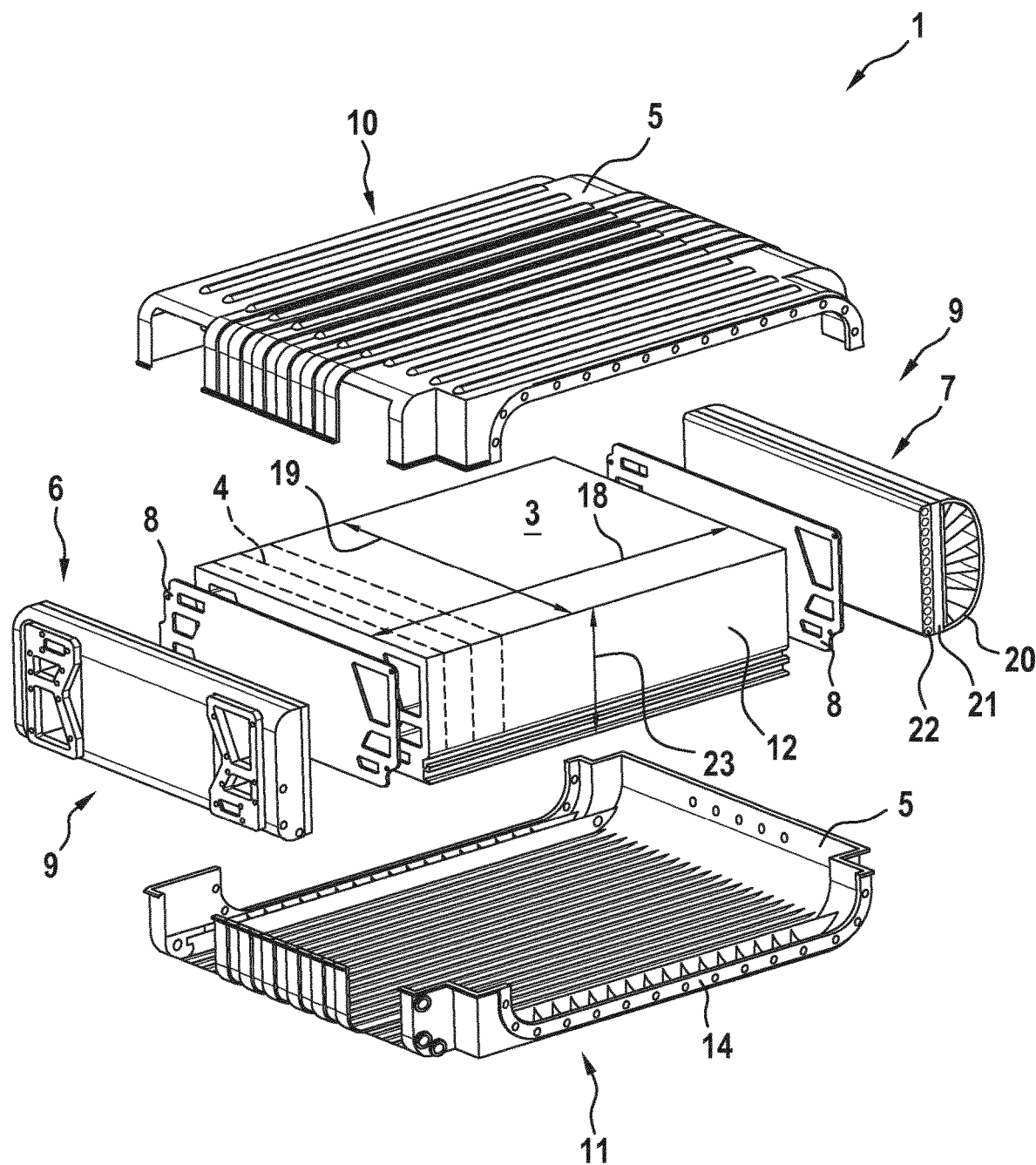
FIG. 1 shows an exploded illustration of an energy supply unit according to the invention having a housing according to the invention in accordance with one exemplary embodiment.
Figure 2:
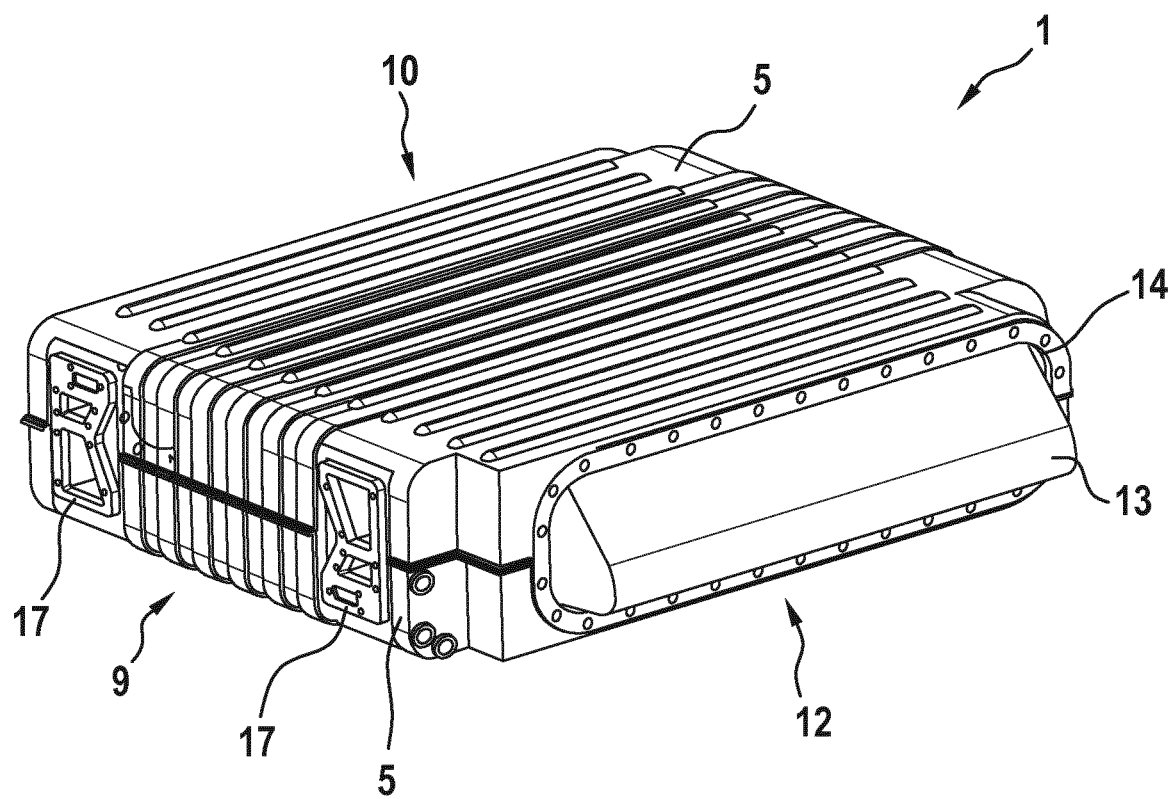
FIG. 2 shows two views of the energy supply unit according to the invention in accordance with the exemplary embodiment.
Figure 2:
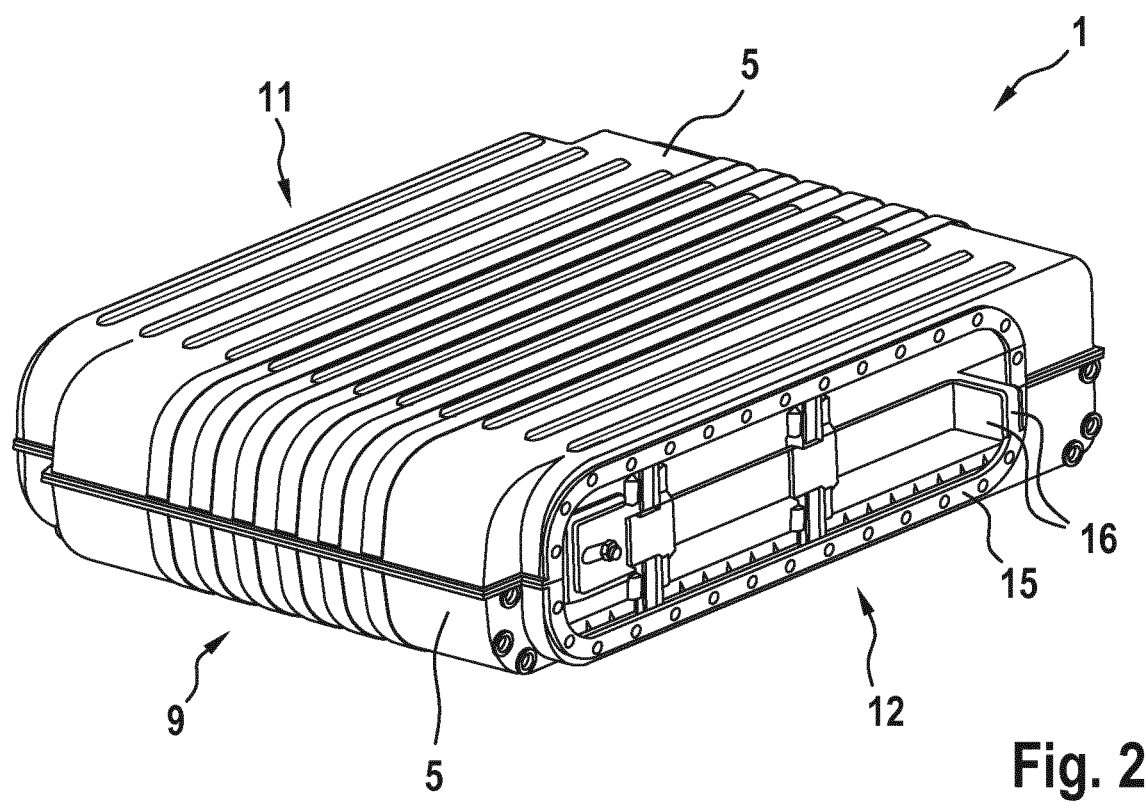

FIG. 1 shows an exploded illustration of the energy supply unit 1. FIG. 2 shows two views of the assembled energy supply unit 1.

The housing 2 includes first and second half shells 5, a first pressure plate arrangement 6 and a second pressure plate arrangement 7.

The stack 3 is arranged between the two half shells 5 and the two pressure plate arrangements 6, 7. The stack 3 and the housing 2 are rectangular. In accordance with the rectangular shape, two end sides 9 which lie opposite one another, an upper side 10, a lower side 11 and two longitudinal sides 12 which lie opposite one another are defined. The upper side 10 and the lower side 11 are the two greatest congruent faces of the rectangular shape.

The stack 3 has a length 18, a width 19 and a stack height 23. The individual bipolar plates 4 are arranged behind one another along the length 19. The two pressure plate arrangements 6, 7 are situated on the end sides 9. A current pickup 8 is positioned in each case between the pressure plate arrangements 6, 7 and the stack 3. The current pickups 8 correspond substantially to the size of a bipolar plate 4.

The upper half shell 5 covers the complete upper side 10 of the stack 3. The lower half shell 5 covers the complete lower side 11 of the stack 3. The two half shells 5 are curved by approximately 90° on the two end sides 9, with the result that each half shell 5 engages around each pressure plate arrangement 6, 7 on the outer side.

Figure 3:
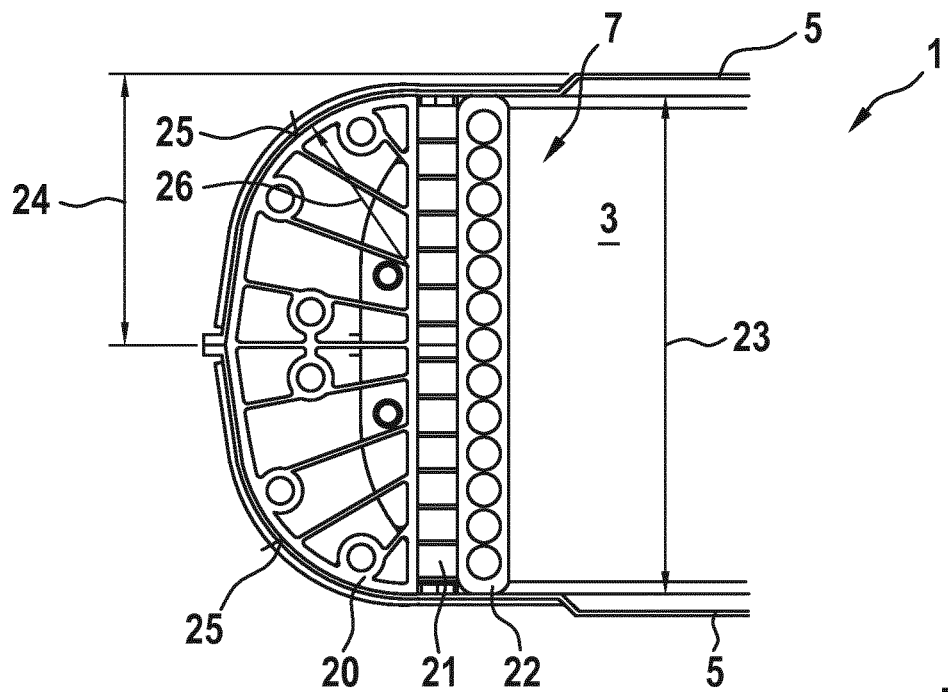
FIGS. 3-6 show different variants for a tolerance compensation system of the housing in accordance with the exemplary embodiment.

To this end, FIG. 3 shows a sectional view of the second pressure plate arrangement 7. In accordance with the sectional view, each of the two half shells 5 has a half shell height 24. The half shell height 24 is defined parallel to the stack height 23.

It is preferably provided at least in places on the end sides 9 that the individual half shell height 24 is at least 30% of the stack height 23. At least in places on the end sides 9, the half shell height 24 is particularly preferably at least 40% of the stack height 23. This ensures that the half shells 5 engage around the pressure plate arrangements 6, 7 as far as possible and provide a sufficient area for the support of the pressure plate arrangements 6, 7.

Furthermore, FIG. 3 shows convex faces 25 of the second pressure plate arrangement 7. A corresponding concave face of the respective half shell 5 lies with a full surface area on the convex faces 25. The radius 26 of the convex faces 25 is configured to be as great as possible.

In accordance with FIGS. 1 and 2, two medium interfaces 17 are configured on the first pressure plate arrangement 6. The medium interfaces 17 serve to exchange fuel (for example, hydrogen), oxidizing agent (for example, atmospheric oxygen) and cooling liquid between the stack 3 and the surroundings. The medium interfaces 17 are situated in corresponding cutouts of the half shells 5, a corresponding seal advantageously being provided between the half shells 5 and the medium interfaces 17.

A first lateral cutout 14 and a second lateral cutout 15 are provided between the two half shells 5 on the two longitudinal sides 12. In accordance with FIG. 2, the first lateral cutout 14 is closed by way of a cover 13. Electronic components for the actuation and/or monitoring of the stack 3 can be arranged, for example, under the cover 13.

The second lateral cutout 15 which lies opposite is open in the illustration in accordance with FIG. 2. Two conductor rails 16 run together in the second lateral cutout 15. The conductor rails 16 are connected to the current pickups 8. The two conductor rails 16 can be contacted via the second lateral cutout 15. After the corresponding contact is assembled, the second lateral cutout 15 is closed by way of a cover (not shown), with the result that the housing 2 receives the stack 3 in a medium-tight manner.

FIGS. 3 to 6 show different refinements for a tolerance compensation system of the housing 2.

In accordance with FIG. 3, the second pressure plate arrangement 7 includes an end plate 20. The two half shells 5 bear against the end plate 20. A tolerance compensation element, configured as a tolerance compensation plate 21, is situated between the end plate 20 and the stack 3. An insulation plate for electric insulation can also be arranged between the tolerance compensation plate 21 and the end plate 20. In addition or as an alternative, the tolerance compensation plate 21 can also be configured as an insulation plate. An inner pressure plate 22 is situated between the stack 3 and the tolerance compensation plate 21.

Before the assembly of the stack 3 between the two half shells 5, the length 18 of the stack 3 is measured. In accordance with the length 18, the tolerance compensation plate 21 can be selected with a fitting wall thickness. Here, the tolerance compensation plate 21 can also be assembled from a plurality of individual plates. In addition or as an alternative to the tolerance compensation plate 21, other tolerance compensation elements can also be used. Thus, for example, resilient components can also be used as tolerance compensation elements.

Figure 4:
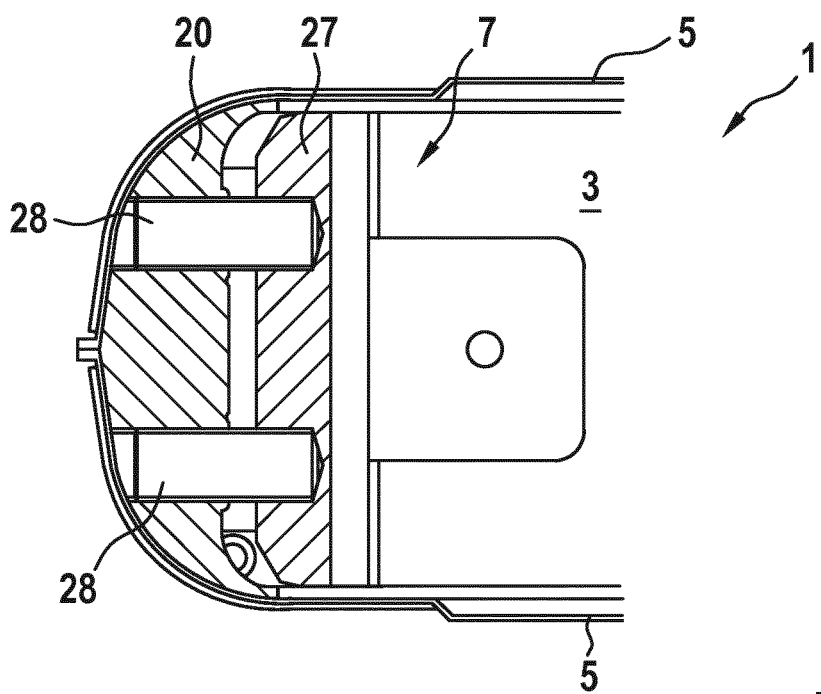

In accordance with the variant in FIG. 4, the second pressure plate arrangement 7 includes a pressing plate 27 in addition to the end plate 20. The pressing plate 27 is situated between the end plate 20 and the stack 3. Here, the spacing between the pressing plate 27 and the end plate 20 is changed via a fitting actuating means. The actuating means can preferably be actuated from outside the housing 2.

In the example in accordance with FIG. 4, the actuating means is formed by way of screws 28. The screws 28 plug into corresponding threads in the end plate 20 and the pressing plate 27. The spacing between the end plate 20 and the pressing plate 27 changes by way of rotation of the screws 28. In this case, openings in the half shells 5 are provided for actuating the screws. As an alternative to screws 28, it is also provided to provide eccentrics and/or wedges as actuating means for the tolerance compensation.

Figure 5:
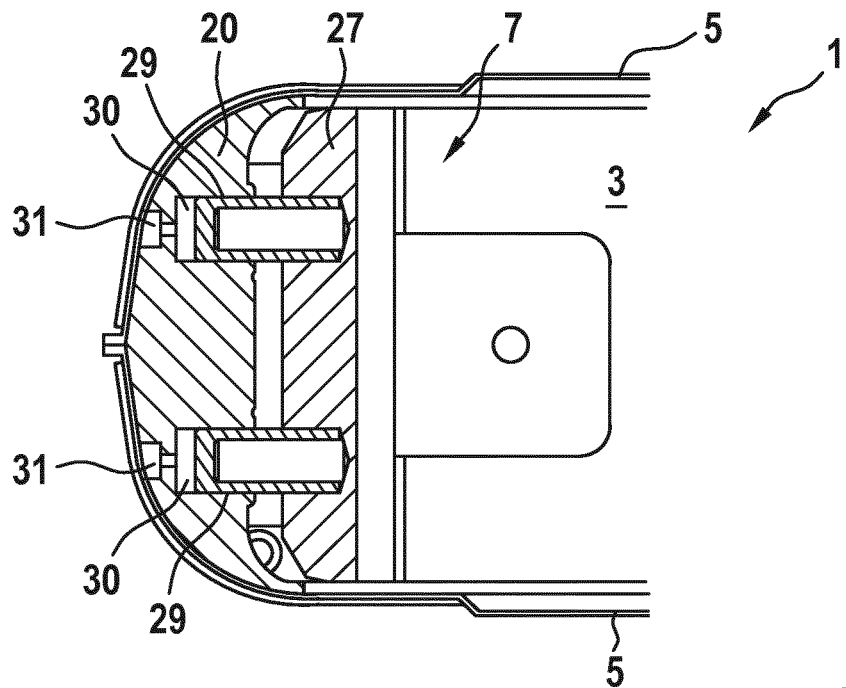

In FIG. 5, the actuating means is formed by way of a cylinder/piston system 29. Cylinders are cut out in the end plate 20. Corresponding pistons are guided in the cylinders.

The pistons in turn are connected to the pressing plate 27. The cylinders are accessible from the outside via first inlets 31 in the end plate 20.

It is provided here, in particular, that a hardenable material, for example, plastic in liquid form, is injected into the cylinders (denoted as a clearance 30 in FIG. 5) via the first inlets 31. As soon as the material has hardened within the clearance 30, the position of the piston and therefore the position of the pressing plate 27 are also fixed.

Figure 6:
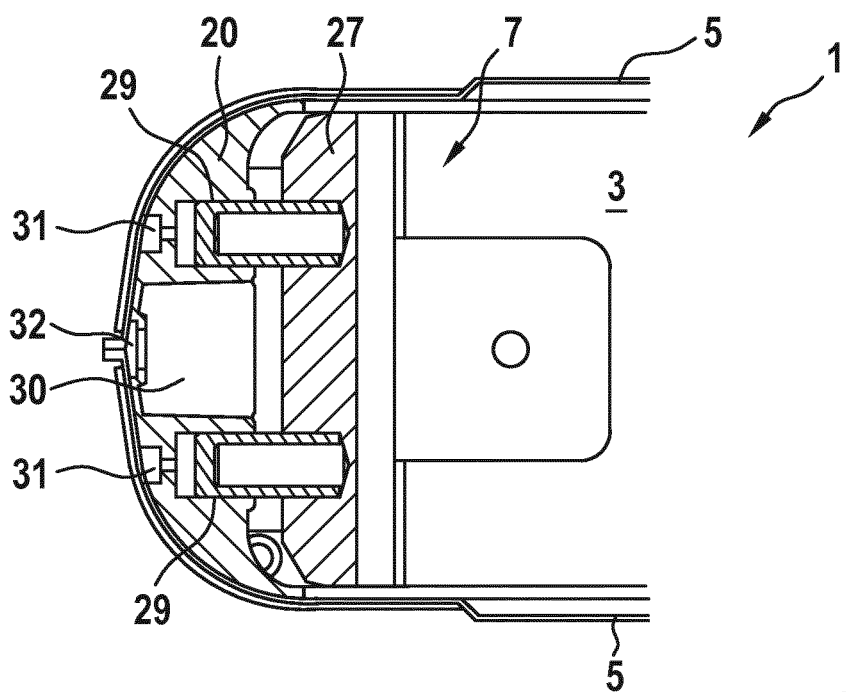

In FIG. 6, the clearance 30 is likewise situated between the end plate 20 and the pressing plate 27, but outside the cylinder/piston system 29. The pistons and therefore the pressing plate 27 are moved via the first inlets 31. This takes place either via a hydraulic pressure via the first inlets 31 or via a corresponding tool which is plugged in via the first inlets 31. The hardenable material is injected into the clearance 30 via a second inlet 32.

It is provided within the context of the invention, in particular, that the stack 3 does not include any dedicated tie rods within the half shells 5. Rather, the housing 2 with its two half shells 5 fulfills the function of the tie rods. This is possible, in particular, by virtue of the fact that the half shells 5 engage around the two pressure plate arrangements 6, 7 on both sides. Here, different lengths 18 of the stack 3 can be taken into consideration, in particular, by way of the tolerance compensation system which is described here.

Figure 7:
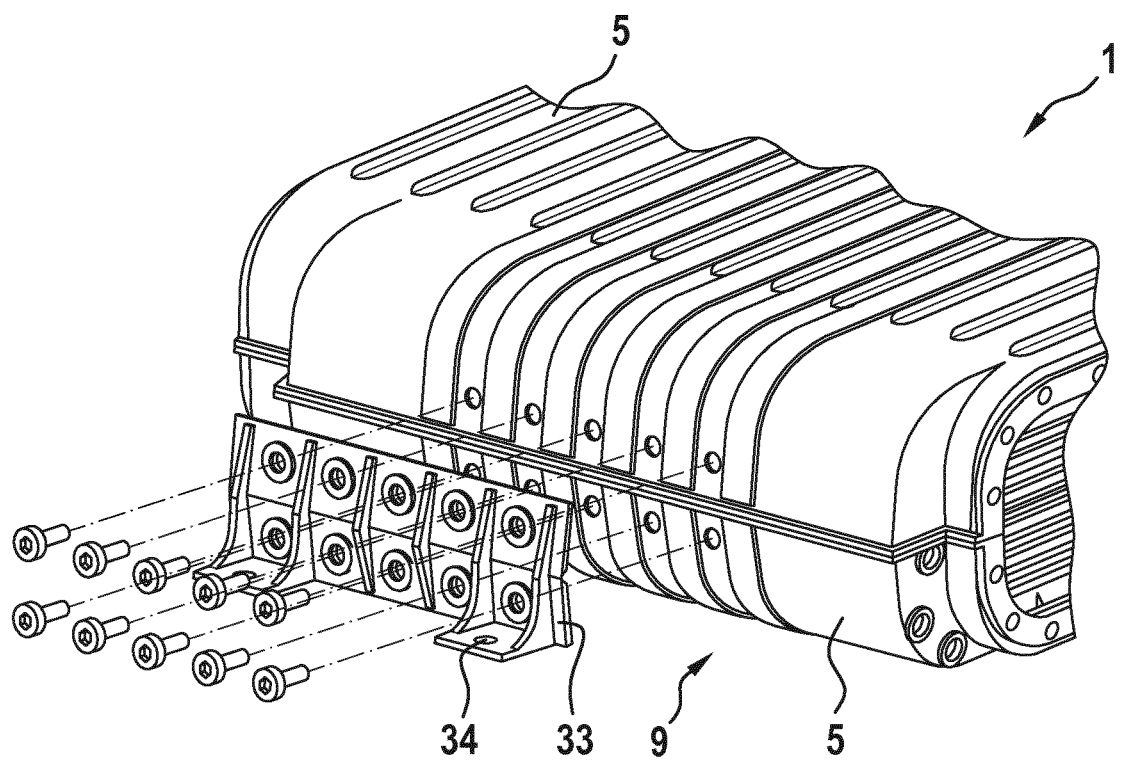
FIG. 7 shows a variant for the connection of two half shells of the housing in accordance with the exemplary embodiment.

FIG. 7 shows a possibility for connecting the two half shells 5. In accordance with the example which is shown here, the two half shells 5 lie directly on one another outside the second pressure plate arrangement 7. In order to connect the two half shells 5, a connecting element 33 is placed on top and is screwed to the two half shells 5. It is provided, in particular, that the connecting element 33 has at least one fastening point 34, via which the energy supply unit 1 can be fastened, for example, in the vehicle.

Figure 8:
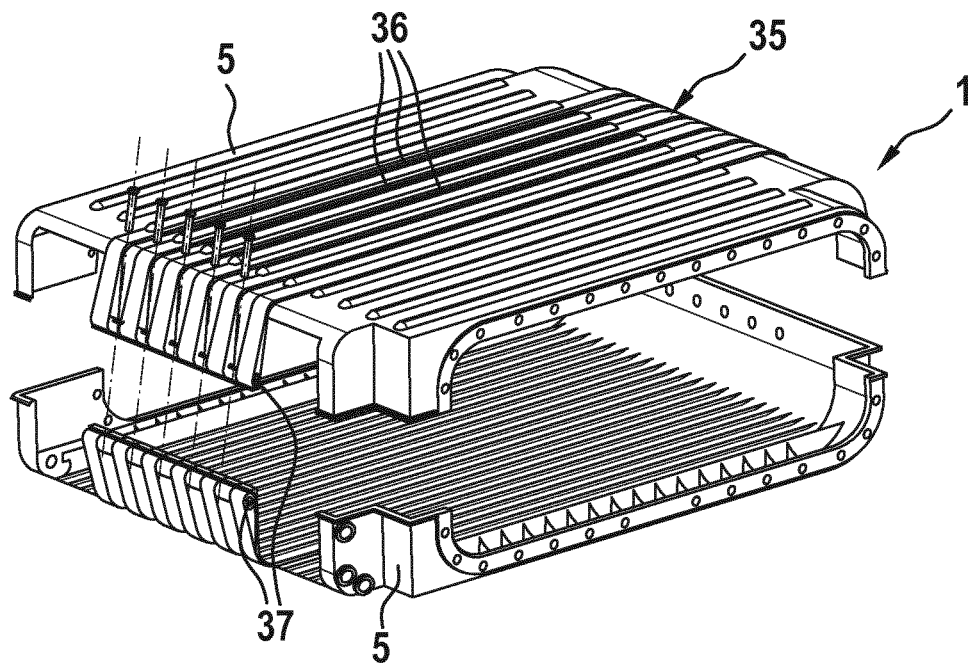
FIG. 8 shows a further variant for the connection of the two half shells of the housing in accordance with the exemplary embodiment.
Figure 9:
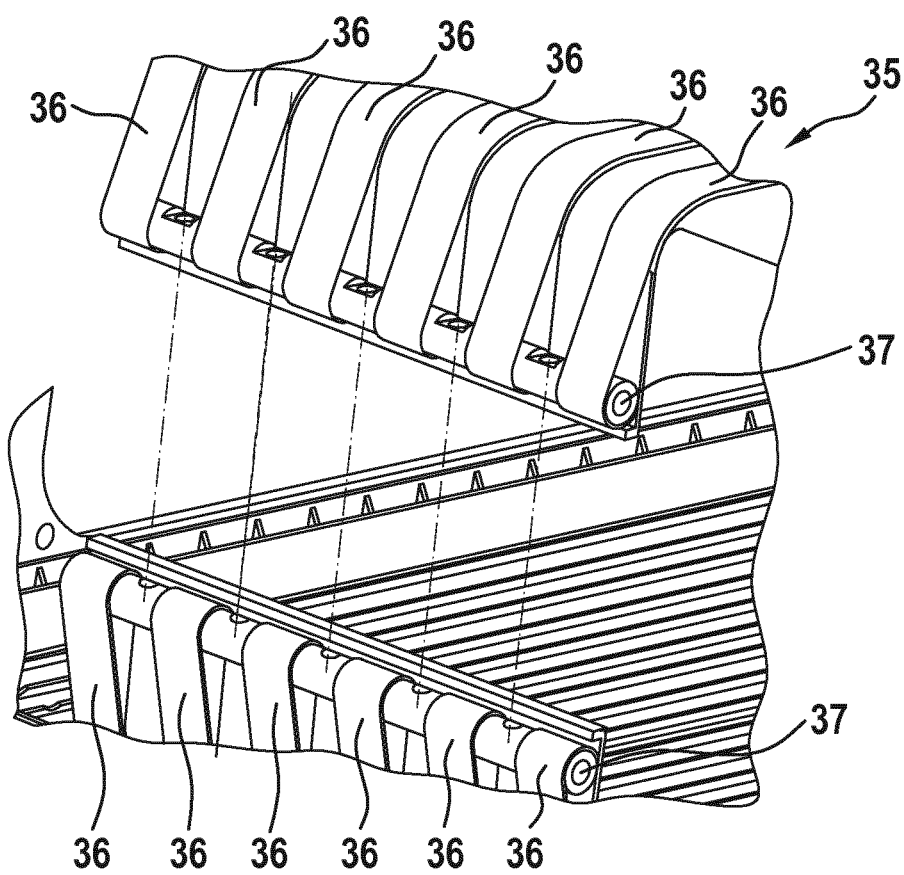
FIG. 9 shows a detail of FIG. 8.

FIGS. 8 and 9 show a further possibility for closing the housing 2. Here, one strap arrangement 35 is provided per half shell 5. The individual strap arrangement 35 includes six straps 36 which extend over the respective half shells 5 from the end side 9 to end sides 9. At the ends, the straps 36 are fastened in each case to strap bars 37. On the end sides 9, the strap bars 37 are connected to one another, for example by way of rivets or screws. The use of the strap arrangements 35 serves not only to close the two half shells 5, but rather also to stabilize the half shells 5.

As an alternative to the variant which is shown, only one strap arrangement 35 can also be used, the straps 36 of which extend over the two half shells 5.

The housing 2 which is shown is advantageously closed in a medium-tight manner. Accordingly, seals are used between the two half shells 5, between the half shells 5 and the covers, and between the half shells 5 and the medium interfaces 17.

LIST OF DESIGNATIONS

1 Energy supply unit
2 Housing
3 Stack, configured as a fuel cell stack or battery stack
4 Bipolar plates
5 First and second half shell
6 First pressure plate arrangement
7 Second pressure plate arrangement
8 Current pickup
9 End sides
10 Upper side
11 Lower side
12 Longitudinal sides
13 Cover
14 First lateral cutout
15 Second lateral cutout
16 Conductor rail
17 Medium interface
18 Length
19 Width
20 End plate
21 Insulation plate and tolerance compensation plate
22 Inner pressure plate
23 Stack height
24 Half shell height
25 Convex faces
26 Radius
27 Pressing plate
28 Screws
29 Cylinder/piston system
30 Clearance
31 First inlet
32 Second inlet
33 Connecting element
34 Fastening points
35 Strap arrangement
36 Straps
27 Strap bars The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A housing for receiving a fuel cell stack or battery stack or capacitor stack, comprising:
   a first half shell and a second half shell that lies opposite the first half shell;
   a first pressure plate arrangement and a second pressure plate arrangement that lies opposite the first pressure plate arrangement;
   wherein the stack is receivable between the first and second half shells and between the first and second pressure plate arrangements, and largest side surfaces of the stack are entirely covered by the first and second half shells,
   wherein the first and second half shells engage around the first and second pressure plate arrangements on an outer side thereof; and
   wherein a strap arrangement, straps of which extend over the outer side of the first and second half shells or the straps of which are integrated into the first and second half shells, assists the first and second half shells in functioning as tie rods.

2. The housing as claimed in claim 1, wherein at least one of the first pressure plate arrangement and the second pressure plate arrangement has convex faces at a transition to an end-side region, and the first and second half shells lay on the convex faces.

3. The housing as claimed in claim 2, wherein the convex faces have at least in places a radius of at least 10 cm.

4. The housing as claimed in claim 1, wherein the strap arrangement comprises strap bars which are connected to one another on the end side, in order to close the housing.

5. The housing as claimed in claim 1, wherein the first and second half shells are connected to one another on both sides, in each case on the outer sides of the first and second pressure plate arrangements.

6. The housing as claimed in claim 2, wherein a connecting element is arranged on at least one side of the housing and is fixedly connected to the first and second half shells.

7. The housing as claimed in claim 1, wherein at least one of the first pressure plate arrangement and the second pressure plate arrangement bears with at least 40% of its outer face against the first and second half shells.

8. The housing as claimed in claim 1, wherein at least one medium interface for exchanging at least one gaseous or liquid medium between the stack and the surroundings is configured in the first pressure plate arrangement.

9. The housing as claimed in claim 1, wherein the second pressure plate arrangement comprises a tolerance compensation system in order to ensure simultaneous bearing of the first and second pressure plate arrangements against the stack and against the first and second half shells.

10. The housing as claimed in claim 9, wherein the second pressure plate arrangement comprises an end plate which bears against the first and second half shells, and a tolerance compensation plate which is arranged with a suitable wall thickness between the end plate and the stack.

11. The housing as claimed in claim 9, wherein the second pressure plate arrangement comprises an end plate which bears against the first and second half shells, and a pressing plate which is arranged between the end plate and the stack, wherein spacing between the end plate and the pressing plate is variable via at least one actuating arrangement.

12. The housing as claimed in claim 11, wherein the actuating arrangement comprises at least one screw and the pressing plate is supported on the end plate by the screw.

13. The housing as claimed in claim 11, wherein the actuating arrangement comprises a clearance between the pressing plate and the end plate, and a hardenable material is injectable into the clearance.

14. The housing as claimed in claim 1, wherein:
at least one of the first and second half shells is made of fiber reinforced plastic in one piece, and/or
at least one of the first and second half shells is made of formed sheet metal in one piece.

15. The housing as claimed in claim 1, wherein a seal for sealing the housing is provided between the first and second half shells.

16. An energy supply unit for a motor vehicle, comprising:
a stack configured as a fuel cell stack, a battery stack or a capacitor stack; and
a housing in which the stack is disposed, the housing including:
a first half shell and a second half shell that lies opposite the first half shell;
a first pressure plate arrangement and a second pressure plate arrangement that lies opposite the first pressure plate arrangement;
wherein the stack is disposed between the first and second half shells and between the first and second pressure plate arrangements, and largest side surfaces of the stack are entirely covered by the first and second half shells,
wherein the first and second half shells engage around the first and second pressure plate arrangements on an outer side thereof; and
wherein a strap arrangement, straps of which extend over the outer side of the first and second half shells or the straps of which are integrated into the first and second half shells, assists the first and second half shells in functioning as tie rods.

17. The housing as claimed in claim 2, wherein the strap arrangement comprises strap bars which are connected to one another on the end side, in order to close the housing.

18. The housing as claimed in claim 2, wherein the first and second half shells are connected to one another on both sides, in each case on the outer sides of the first and second pressure plate arrangements.

19. The housing as claimed in claim 2, wherein at least one of the first pressure plate arrangement and the second pressure plate arrangement bears with at least 40% of its outer face against the first and second half shells.

20. The housing as claimed in claim 1, wherein at least one medium interface for exchanging at least one gaseous or liquid medium between the stack and the surroundings is configured in the first pressure plate arrangement.

* * * * *